J. H. McMICHAEL.
METHOD OF AND APPARATUS FOR TRANSPORTING AND TREATING CONCRETE.
APPLICATION FILED JAN. 14, 1907. RENEWED JAN. 23, 1911.
1,127,660.     Patented Feb. 9, 1915.
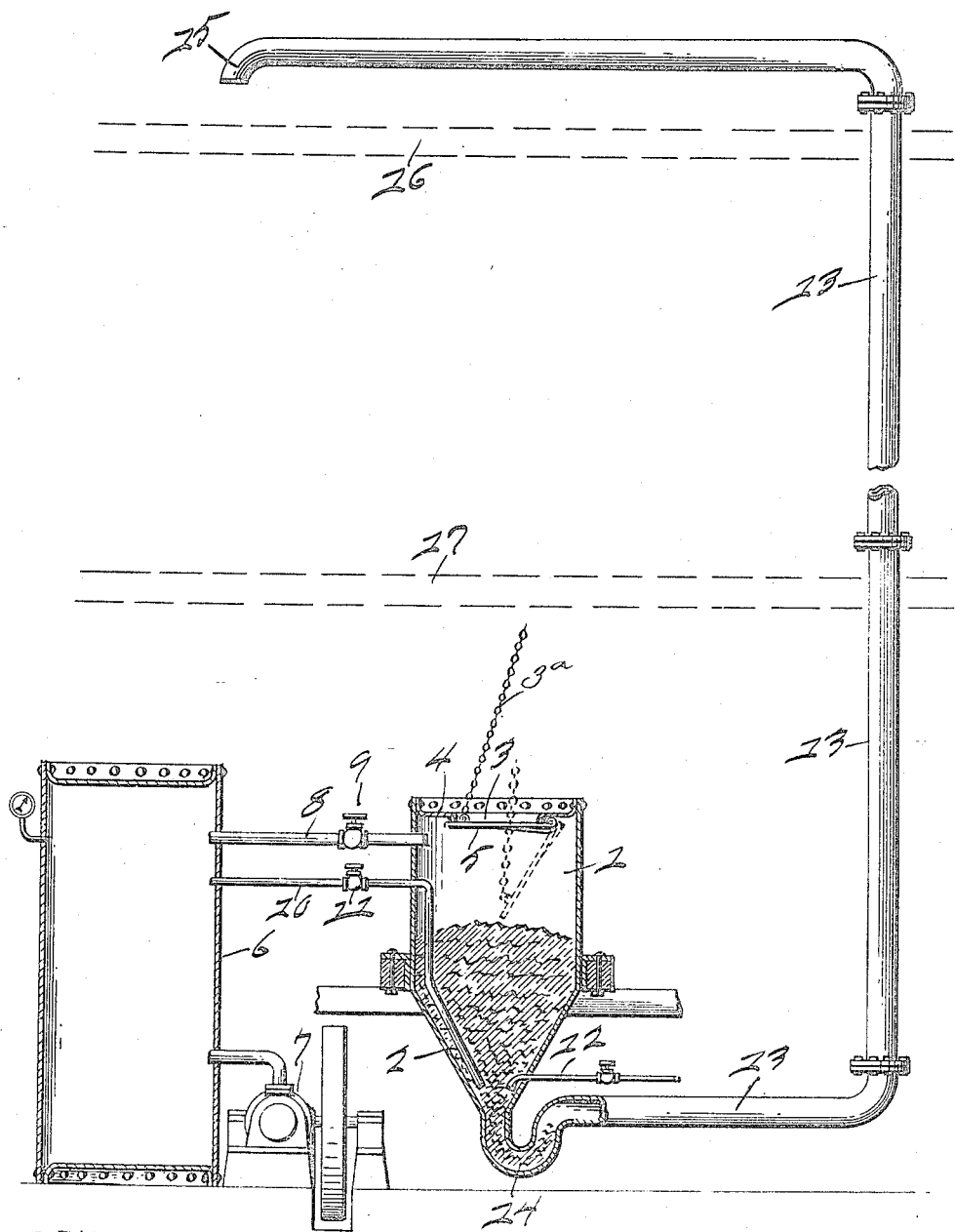

UNITED STATES PATENT OFFICE.

JOHN H. McMICHAEL, OF TOLEDO, OHIO, ASSIGNOR TO CONCRETE MIXING AND CONVEYING COMPANY, OF CHICAGO, ILLINOIS, A CORPORATION OF ILLINOIS.

METHOD OF AND APPARATUS FOR TRANSPORTING AND TREATING CONCRETE.

1,127,660.     Specification of Letters Patent.     Patented Feb. 9, 1915.

Application filed January 14, 1907, Serial No. 352,089. Renewed January 23, 1911. Serial No. 604,236.

*To all whom it may concern:*

Be it known that I, JOHN H. McMICHAEL, of Toledo, county of Lucas, and State of Ohio, have invented certain new and useful Improvements in Methods of and Apparatus for Transporting and Treating Concrete; and I do hereby declare that the following is a full, clear, and exact description thereof, which will enable others skilled in the art to which it appertains to make and use the same, reference being had to the accompanying drawings, and to the figures of reference marked thereon, which form part of this specification.

This invention relates to a method of and an apparatus for transporting and treating concrete.

The invention has for its object to provide a method of and an apparatus for elevating and transporting material of the character mentioned in a more expeditious manner and with greater facility than is possible by the employment of ordinary methods and mechanisms.

In carrying out my invention I employ the apparatus illustrated in the accompanying drawing, the same being shown partly in section.

Referring to the details 1 is a receiver or chamber for the material to be treated or transported, the lower portion of the chamber being conical or hopper-like in form as indicated at 2. The cover or top 4 is provided with an upstanding circumferential rim which adapts it for use as an initial receiver or charge holder for materials to be deposited in the chamber 1. The cover 4 is provided with an opening 3 in which there is a door or removable seal 5 hinged or otherwise mounted so as to close the opening when it is in the position indicated by the full lines of the drawing.

3ª is a chain or rope connected with the seat and adapted to be used for partially or entirely closing it and holding it in closed position.

It will be observed that if air pressure is supplied to the interior of the chamber, (as will be hereinafter described) after the seal is closed or nearly closed it acts upon it and aids in holding it in closed position.

6 is a pressure tank or reservoir for compressed air supplied by an air-compressor 7, and 8 is a connection leading the air under pressure from the tank to the chamber 1, the air inlet into the chamber being preferably near the top thereof, and the passage of air through the connection 8 being controlled by a valve 9.

10 is an air-pipe controlled by a valve 11, and also leading air into the chamber, the delivery end of said pipe being at or near to the discharge or lower end of the hopper 2. There is also a valve-controlled water supply-pipe 12 adapted to deliver water at the lower end of the hopper when desired.

Leading from the lower end of the hopper 2 is a conveying-tube or discharge duct 13 having a crook or U-shaped bend 14, the delivery end of the conveying-tube being at 15. The broken lines 16 and 17 indicate the floors of a building, the conveying-tube in the illustration, being shown directed upward to elevate the material deposited in the chamber, the delivery end extending in a lateral direction to deliver the material at the most convenient point on the floor.

In operation, the material to be elevated is deposited in the chamber through the opening therein, falling into and occupying the hopper-like lower portion thereof, as shown. The door for the opening in the chamber is then closed and the air turned into the chamber from the reservoir, the air in which may be maintained under any desired pressure. The instant the air is turned into the chamber the door for the closure will be firmly held in closed position by the air pressure. Owing to the pressure in the receiver the material in the hopper will be forced downward and directed into the conveying-tube, being carried along by the latter until it is finally discharged at 15. Owing to the provision of the U-shaped bend in the conveying-tube immediately after leaving the hopper, the material will be more or less tightly packed as it is directed therethrough. To provide the required amount of moisture to serve as a lubricant to start the material out of the hopper and also to aid its movement within the conveying-tube, water from the pipe 12 may be turned into the lower part of the hopper to mix with the material as it enters the conveying-tube. This water introduced through the pipe 22 and mixed with the other materials gives increased fluidity to the mass and permits it to be more readily handled.

As long as the air pressure in the chamber is maintained, the closure for the opening thereinto remains closed. However, the instant the material is discharged from the end 15 of the conveying-tube, the air pressure will drop and the door will open automatically and serve as a signal to the operator of the apparatus to shut off the air to the chamber. On account of the high air pressure serving to hold the door 5 in closed position, the supplying of material for the next charge can be commenced as soon as the door has been closed. In this way time will be saved at each charge. The material which accumulates in the charging region 4 will be automatically discharged into the chamber 1, as soon as the pressure is sufficiently relieved by the discharge of the material out of the end of the pipe at 15, to permit the seal to open.

To loosen the material at the lower end of the hopper and to assist its movement, I provide the additional air-pipe adapted to discharge air into and through the material.

It will be observed that the pipe 8 serves primarily to produce the air pressure in the chamber 1, and maintain it until the charge is expelled. The lower air pipe 10 which extends to a point immediately adjacent the delivery pipe or discharge duct 13 serves the double function of preventing choking in the entrance to the delivery pipe and of supplying air under pressure in sharp jets directly to the delivery pipe itself. I have found that the supplemental air pipe 10 is very effective in aiding the passage of the material into and through the conveyer pipe. The pressure in the chamber supplied through the pipe 8, is, of course, to a certain extent expended in overcoming friction, and in cases where the friction is serious, the second air pipe located at or near the entrance of the delivery pipe, gives to the material the velocity which is needed to carry it to the remote point of delivery.

It will be observed that the upper air pipe 8 serves merely to supply air to the upper part of the chamber 1, the pressure of the air being uniformly applied over the entire upper surface of the mass. The lower pipe 10, however, serves to direct a jet of air moving at a considerable velocity directly against portions of the mass as they move toward and into the discharge duct. The two pipes thus act in very different ways, the upper pipe supplying air which acts by pressure and the lower pipe supplying air which acts by velocity. On account of the presence of large and small particles, and on account of the presence of water, a mass of concrete forming materials (whether completely mixed or not) is relatively compact and impervious to air, and on this account the upper air body acts by applying a uniform pressure to the entire upper mass surface and without any substantial penetration of the air itself to the interior of the mass. Air from the lower pipe 10 may force itself into the body of the mass, and the relatively small air jet acting upon the relatively large stream of outward moving materials directly engages with the sub-masses to push them along. This action of the two air bodies in my apparatus is to be contrasted with the action of air in earlier devices which were so constructed that light materials such as grain or ashes could be caught in large moving air bodies and carried along in suspension with each particle separated from the others. One of the strongly marked and novel matters incident to this provision of the pipe 10 for introducing air directly into the discharge pipe, whether considered by itself or considered as supplemental to the agency such as the air from pipe 8 tending to effect downward and forward propulsion of the entire mass, is this, that the rapidly moving air from pipe 10 acts upon sub-masses, successively of the general mass, at points near those where they enter the delivery pipe, the result being that the thorough commingling of the ingredients (rock pieces, sand, cement and water) well understood by the engineer to be essential to a perfect concrete, can be attained with great rapidity and with a perfect, uniform, distribution of the various ingredients as concerns the relative positions of all the component particles.

As is well known, the material referred to as concrete is a composition containing relatively large pieces of rock or stone, as uniform in size as possible, together with predetermined proportions of sand, cement and water. The purpose of this composition is, ultimately, to have, in a desired position, a hard rock-like body which will resist disintegration and fracture. The relatively large pieces of rock components must, in order to attain this end, be thoroughly coated, over all their faces, with a layer of the binding material (cement, sand and water) in the proper proportions, chemically, to insure that, from and after the instant of commencement of the "setting" or crystalizing action of the mass, all the particles shall be uniformly in their necessary distributive relation, and particularly to insure that the relatively large pieces of rock shall, throughout the mass, be held, at all points of the surfaces of each, with the necessary cohesion. Prior to my invention builders have aimed to secure this desideratum (in the mixing or commingling of the ingredients) either by manipulating predetermined masses of the several ingredients with shovels, or other hand tools, or by subjecting them to the action of mechanical mixers of one form or another, prior to taking them to the position of ultimate placing and setting. But experience has shown that the best results in this respect have not been attained. The period of time after the water first comes in contact with the cement is an important factor, the setting or crystallizing beginning instantly upon such contact. And with hand-mixing devices it is impossible to attain the above described desirable and essential, intimate, and uniform mixing of the constituent parts and securing their proper distributive relation, it being well known to engineers that hand-mixed concrete masses have unavoidably incident to them numerous regions of improperly coated rock and of improperly mixed components. It is frequently necessary, and generally practised, to apply by brooms, or equivalent devices, an extra mass of grout-like water and cement before the mixing operation is regarded as completed. And, as concerns the mechanical mixers which handle the ingredients in relatively large masses, it is found that in order to effect the mixing rapidly enough the masses must be discharged before there has been the intimate and uniform commingling that is necessary. The above pointed out difficulties incident to the thorough mixing of the concrete constituents and to the complete coating of the rock pieces with binding material become especially serious when a relatively stiff mixture is made, that is one in which there is little or no excess of water beyond that necessary for causing crystallization. It is more or less common practice to add an excess quantity of water in order to insure at least approximately complete coating of the rock pieces in as short a time as possible. This excess quantity of water not needed for crystallization must of course evaporate before the concrete can reach its final dry condition. One of the important advantages incident to the use of a device embodying my invention is that this undesirable excess of water can be reduced to a minimum or entirely eliminated, satisfactory coating of the rock pieces being found to be possible when the binding material is relatively stiff. While an apparatus embodying my invention is especially well adapted for the handling of a mass of concrete forming elements containing little or no excess of water, it will be understood that its use is not limited to the handling of such a mass. It is equally well adapted for the treating and handling of a mass containing a considerable excess of water in case such an excess is for any reason found desirable. After the imperfect mixing attained in any of these earlier ways which have been mentioned the aim has been to transport the concrete from the place of mixing, (whether by barrows, mechanical conveyers, or other mechanism) to the place of its final deposit in such a way as not to destroy the original distributive relation of the constituent parts of the mass established in the mixer.

I have found that with a mechanism of the sort herein presented a very superior distributing and mixing of the ingredients can be obtained, even where a partially complete work of this sort has been effected preliminary to the introduction of the concrete into the chamber 1. The powerful jets of air or fluid agent are introduced through the pipe 10 as above described in such way as to insure a pressure in the discharge pipe and apply it to the concrete at points where, or near where, it escapes from the main receptacle. This causes the relatively large rock pieces, at the points where they commence their travel in the discharge pipe, to move with considerable violence in the general direction of the pipe toward the place of delivery, insuring that they shall be so agitated or relatively moved in the midst of the binding or cementing material that they shall be uniformly coated or covered with the latter, and, at the same time, the air is delivered in relation to the entire mass in such a way that components are not driven apart, or carried to different distances because of differences in specific gravity. But, while the apparatus which I have shown is adapted for the handling and the delivery in mixed condition of materials not initially mixed at the time of deposit in the chamber 1, I nevertheless do not herein claim as a part of my present invention the method of conveying and simultaneously mixing such initially unmixed materials. This subject-matter is presented and claimed in my co-pending application for mechanism and process for mixing and transporting concrete and similar materials, Serial No. 580,582, filed September 6, 1910. The best results are attained by having the delivery pipe of a relatively large diameter so that there shall be freedom for these relative movements of the rock particles and of the sub-masses that are forcibly impelled ahead of the air jet. The delivery pipe itself becomes a mixing chamber wherein pneumatic mixing is effected or continued, and, if this duct is of a size properly related to the other parts, and to the sizes of the particles of the materials, the latter can be rapidly impelled through it without danger of clogging or choking. The engineer, in any instance, will readily understand what the relative proportions of the parts should be; but I have found that for concrete with, as aforesaid, its masses of relatively large rock pieces, the diameter of the delivering and mixing pipe 13 should be from six to ten inches, the latter generally preferable, this being in contrast with the relatively small delivery tubes frequently used in pneumatic apparatus, and not designed, as described, to permit such relative motions of large component particles as will insure perfect mixing. This action may be enhanced by providing one or more deflections in the path of the material, causing it, as an entirety, to be broken up, as, for instance, by the bend in the pipe at 14, which, as above described, also slightly checks the advancing mass or sub-masses to assist in preventing the water or other ingredients from separating from the general mass because of difference in specific gravity. All of the features of the invention, however, are not limited to the presence of such bends, as the same results can be attained by other ways now well known to engineers. The path for the material commencing with the points where it is initially introduced into the receptacle 1 and extending to the point of ultimate delivery, is, practically, entirely clear, that is to say, it is at no place provided with positively stopping projections, even at the bends in the delivery pipe, the path at the bends being of the same cross area as at other parts of the pipe; and consequently there are no points where a number of rock pieces can aggregate and choke the duct or commence to form a stoppage.

I am aware that it has been heretofore proposed to employ pneumatic apparatus for conveying each of many materials from point to point. This apparatus has included mechanism for conveying materials like grain and also pneumatic mechanism for transporting materials of a readily flowing or viscous consistency such as "grout", a composition all of whose particles are minute and easily commingled. The pneumatic propelling of these various materials has been effected through discharge pipes of relatively small diameter in which because of the fineness of the particles of material transported there was no danger of clogging, and which were not intended to be used as mixing chambers for the material in transit. None of these forms of mechanisms were found available for the treating of concrete, because of the reasons above explained, and up to the time of my invention no mechanisms for handling concrete were in use.

It will be seen that the receptacle 1 is not only practically unobstructed, as above described, but is so constructed that the material is gradually guided or directed to the large discharge pipe, this guidance being effected by the walls of the receptacle, which join the duct walls with substantial smoothness. This is a matter of great importance where pneumatic pressure is depended on to effect the discharge. The pressure is initially applied over a relatively large top surface and although but a limited part of this pressure surface is effective in driving the material along the discharge tube, (namely, that on a central column of about the same cross area as the discharge tube) the pressure upon the marginal part of the mass top surface acting in conjunction with the converging walls of the conical bottom compels the entire mass to press toward the center and to escape into the pipe with great rapidity and force. And in this respect the mechanism is contradistinguished from those in which discharge pipes are connected with relatively flat wall parts of materials containing receptacles.

Although I have illustrated the apparatus for elevating material, as would be required where concrete is to be delivered to the upper floors of a building under construction, it is apparent that the invention is of advantage for transporting material along a level, as in the construction of bridges, tunnels, etc.

Having described my invention, what I claim and desire to secure by Letters Patent, is:—

1. In combination, a chamber for containing concrete forming materials, a conduit leading therefrom, and having its walls joining the chamber walls with substantial smoothness, and two compressed air inlet pipes connected to the chamber, one of them terminating in a nozzle inside the chamber directed toward the opening into the said conduit and the other pipe opening into the chamber at a point remote from said nozzle.

2. In combination, a chamber for containing concrete forming materials, a conduit leading therefrom, a compressed air inlet pipe connected to a part of the chamber remote from the conduit, and another compressed air inlet pipe leading through the chamber wall and terminating within the chamber near the opening into the conduit in a nozzle directed toward said opening.

3. The method of conducting concrete forming materials through a closed conduit, which consists in introducing the materials in a mass into a chamber connected to said conduit, introducing relatively compressed air behind the whole mass and behind a front portion thereof, and thereby detaching successive portions and driving them from the chamber into the conduit and along the latter.

4. The method of conducting concrete forming materials from a receptacle along a closed conduit connected therewith to the place where it is to be utilized, which consists in closing the receptacle, introducing compressed air behind the mass of materials and also behind the portion thereof lying adjacent the conduit, and thereby pushing the mass into and along the conduit.

5. The herein described method for treating and conveying a relatively compact and impervious mass of concrete forming materials, which consists in violently ejecting the mass from a chamber into and through a relatively large continuous duct by means of a pressure agent applied behind the mass and a pressure agent introduced into the mass in the general direction of motion thereof at a point along its path.

6. The herein described method of treating and conveying a relatively compact and impervious mass of concrete forming materials which consists in positioning the mass in a chamber connected with an extended outlet passageway, applying air pressure behind the mass within the chamber to force it toward the outlet passageway, and injecting a jet of air under pressure into the mass at an angle to the line of movement of the mass into and through the said passageway.

7. The herein described method of treating and conveying a mass comprising rock, sand, cement and water in concrete forming proportions, which consists in positioning the mass in a chamber having a relatively large cross sectional area and connected with an extended passageway having a smaller cross sectional area, applying to the mass within the chamber air pressure for the purpose of propelling the mass toward and into the said extended passageway, and injecting into the mass at a point adjacent the connection between the chamber and passageway a jet of air so directed as to mingle with the mass and aid its movement along the said passageway.

8. The herein described method of treating and conveying a mass of rock, sand, cement and water in concrete forming proportions, which consists in positioning the mass in a chamber which is connected with a relatively extended passageway, applying air pressure to the mass in the chamber to force it toward and into the passageway in a compact stream, and injecting into the stream at a point along its path and in the general direction of its movement a jet of air which has a small cross sectional area as compared with that of the stream.

9. The herein described method of treating and conveying a mass of rock, sand, cement and water in concrete forming proportions, which consists in applying air pressure to the mass to eject it from a chamber into a passageway, maintaining the mass in a compact stream as it approaches the entrance to the passageway, and at a point along its path into and through the passageway injecting into the mass a jet of air at an angle to the line of movement along the said path, the cross sectional area of the said jet being small as compared with that of the stream.

10. The herein described method of treating and conveying a mass of rock, sand, cement and water in concrete forming proportions, which consists in positioning the mass in a chamber having a relatively large cross sectional area, applying air pressure to the mass to eject it from the chamber into a relatively extended passageway having a smaller cross sectional area, maintaining the mass in a compact stream as it approaches the entrance of the said passageway, and injecting into the mass at a point adjacent the point of communication between the chamber and the passageway a jet of air for the purpose of aiding the movement of the mass along the passageway, the cross sectional area of the said jet being small as compared with that of the stream.

11. The herein described method of treating and conveying a mass of rock, sand, cement and water in concrete forming proportions, which consists in feeding the mass in a compact stream, and subjecting successive portions of the stream to the action of an air jet so directed as to aid the movement of the successive portions along a relatively extended pathway, the cross sectional area of the said jet being small as compared with the cross sectional area of the stream.

12. The herein described method of treating and conveying a mass of rock, sand, cement and water in concrete forming proportions, which consists in subjecting successive portions of the mass at the bottom of a relatively large mass body to the action of a jet of air so directed as to aid the movement of said portions along an extended pathway.

13. The herein described method of treating and conveying a mass of rock, sand, cement and water in concrete forming proportions, which consists in subjecting successive portions of the mass at the bottom of a relatively large mass body to a jet of air so directed as to aid in causing the movement of the said portions away from the said main mass body and guiding the said portion along a path which, at points adjacent the said jet, is at an angle thereto.

14. The herein described method of treating and conveying a mass of rock, sand, cement and water in concrete forming proportions, which consists in subjecting successive portions of the mass to the action of a jet of air moving at high velocity, and subjecting the main body of the mass to air under pressure for the purpose of advancing the mass gradually into the range of action of the said velocity jet.

15. The herein described method of treating and conveying a mass of rock, sand, cement and water in concrete forming proportions, which consists in subjecting successive portions of the mass to the action of a jet of air moving at high velocity, and subjecting the main body of the mass to pressure for the purpose of advancing the mass gradually into the range of action of the said velocity jet.

16. In a conveyer, a chamber, a receiver, a removable seal between the receiver and the chamber, a discharge pipe connected with said chamber, a pressure pipe connected with the chamber, and a water pipe connected with the chamber.

17. In a device for treating and moving a mass of concrete forming materials, the combination of a chamber for receiving and containing the said mass, a discharge duct connected with the chamber, an air inlet pipe connected with the chamber, means for preventing the flow of air or materials out of the chamber except through the discharge duct, means for supplying air under pressure through the said pipe to the chamber back of the mass of materials therein to push the said mass toward and into the discharge duct, and means for causing a jet of air to impinge upon successive portions of the mass in the general direction of the discharge duct to directly assist their movement therethrough.

18. In a device for treating and moving a mass of concrete forming materials, the combination of a chamber for receiving and containing the said mass, a discharge duct connected with the chamber and extending to a discharge point in a horizontal plane above the chamber, an air inlet pipe connected with the chamber, means for preventing the flow of air or materials out of the chamber except through the discharge duct, means for supplying air under pressure through the said pipe to the chamber back of the mass of materials therein to push the said mass toward and into the discharge duct, and means for causing a jet of air to impinge upon successive portions of the mass in the general direction of the discharge duct to directly assist their movement therethrough.

19. In a device for treating and moving a mass of materials for forming concrete, the combination of a receiver, a removable seal connected with the receiver, a chamber with which the receiver communicates when the seal is removed, a discharge duct connected with the chamber, and having a substantially unbroken inner surface, the said chamber having walls which gradually converge on all sides to the duct and join the duct walls with substantial smoothness, and means for supplying a pressure agent both to the chamber back of a mass of materials therein and to the discharge duct.

20. In a device for treating and delivering materials for forming a concrete mass, the combination of a chamber for the said materials, a relatively large discharge duct having an unobstructed interior and unobstructed communication with the chamber, the chamber having walls which gradually converge on all sides toward the discharge duct, and join the duct walls with substantial smoothness, and means for delivering a pressure agent to the chamber behind the mass of concrete materials therein.

21. In a device for treating and moving a mass of concrete forming materials, the combination of a chamber adapted to receive and contain the said mass, a discharge duct connected with the chamber, the said chamber having walls which gradually converge on all sides to the duct, and join the duct walls with substantial smoothness, means for supplying a fluid pressure agent to the chamber back of a mass of materials contained therein, and means for directing a fluid pressure agent into the discharge duct in the general direction thereof.

22. In a device for treating and moving a mass of ingredients for forming concrete and containing relatively large pieces of material, the combination of a relatively large discharge duct, a pressure chamber for receiving the said ingredients of the concrete mass, said chamber having walls which gradually converge to the discharge duct and join the duct walls with substantial smoothness, the parts being arranged to have pressure exerted upon the material within the discharge duct from the surface of the mass in the chamber on lines extending directly into the discharge duct.

23. In a device for treating and moving a mass of materials for forming concrete, the combination of a receiver, a chamber, a removable seal between the receiver and the chamber, a discharge duct connected with the chamber, the said chamber having walls which gradually converge on all sides to the duct and join the duct walls with substantial smoothness, and means for delivering a pressure agent to the chamber back of a mass of materials therein to assist the movement of the said mass into and through the said discharge duct.

24. In a device for treating and moving a mass of concrete forming materials, the combination of a chamber adapted to receive and contain the said mass, a discharge duct connected with the chamber and extending from it to a discharge point in a horizontal plane above the chamber, and means for directing a pressure agent into the discharge duct in the general direction thereof to engage sub-masses of the materials and aid their movement through the duct to the discharge point.

25. In a device for treating and moving a mass of concrete forming materials, the combination of a receiver, a charge containing chamber connected with the receiver, a removable seal between the receiver and the chamber, a discharge duct connected with the chamber, and means for directing a jet of elastic fluid under pressure into the discharge duct in the general direction thereof to engage succesive portions of the said mass to aid their movement into and through the said duct.

26. In a device for treating and moving a mass of concrete forming materials, the combination of a chamber adapted to receive and contain the said mass, a discharge duct connected with the chamber, the said chamber having walls converging to the duct, means for directing a jet of elastic fluid under pressure into the discharge duct in the general direction thereof to engage successive portions of the said mass to aid their movement through the said discharge duct, and means for supplying water to the mass in the chamber as it enters the discharge duct.

27. In a device for treating and delivering a mass of materials for forming concrete, a chamber for the said materials, a discharge duct, the walls of the chamber converging gradually on all sides to the discharge duct and joining the duct walls with substantial smoothness, and the path from the chamber into and through the duct being entirely clear, and means for moving the materials from the receptacle into and through the discharge duct along straight lines extending directly from the chamber into the discharge duct.

28. In a device for treating and delivering a mass of materials for forming concrete, the combination of a chamber, a discharge duct communicating with the chamber, a pipe for delivering a jet of fluid pressure agent for propelling the said concrete materials, a manually controllable valve in the said pipe, the said pipe being arranged with its receiving end outside of the said receptacle and with its delivery end outside of the discharge duct but adapted to deliver the jet of fluid agent to the interior thereof, the interior of the said discharge duct being thus left substantially unobstructed.

29. In a device for the treatment and transportation of concrete forming materials, the combination of a chamber for the said mass, a discharge duct connected with the chamber, the chamber walls joining the duct walls with substantial smoothness, and a means for supplying a jet of fluid pressure agent in the general direction of the duct at a point adjacent its point of connection with the chamber to engage sub-masses of materials to assist their movement through the duct.

30. In a device for treating and delivering a mass of ingredients for forming concrete, the combination of a chamber for receiving and containing the said ingredients of the concrete, a discharge duct connected therewith, the said chamber having walls which gradually converge on all sides to the duct and join the duct walls with substantial smoothness, an air pipe for delivering air or equivalent fluid agent under pressure to the interior of the discharge duct on lines inclined to the longitudinal lines of the discharge pipe and inclined to an axial line of the chamber, and a manually controllable valve in the said air pipe.

31. In a device for treating and transporting concrete forming materials, the combination of a chamber for receiving and containing a mass of the said materials, a discharge duct leading from the chamber, the said chamber having walls which gradually converge on all sides to the duct and join the duct walls with substantial smoothness and the path from the chamber into and through the duct being entirely clear, the duct being provided with a bend at a point adjacent the chamber, and means for directing a jet of fluid pressure agent into the duct along lines cutting the path of materials through the bend thereof to engage sub-masses of the said materials to assist their movement.

32. In a device for the treating and transporting of concrete forming materials, the combination of a chamber for containing a mass of the said materials, a duct leading from the chamber, the chamber having walls which gradually converge on all sides to the duct and join the duct walls with substantial smoothness, the said duct being provided with a bend, means for directing a jet of fluid pressure agent into the duct along line cutting the path of materials through the bend thereof to engage sub-masses of the said materials and assist their movement, and additional means tending to cause the movement of the materials from the chamber into the duct.

33. In a device for treating and moving a mass of concrete forming materials, the combination of a chamber adapted to receive and contain the said mass, a discharge duct connected with the chamber, the said chamber having walls converging on all sides to the duct, means for supplying a pressure agent to the chamber back of a mass of materials contained therein, means for directing a pressure agent into the discharge duct, and means for supplying water to the mass in the chamber as it enters the discharge duct.

34. In a device for treating and moving a mass of concrete forming materials, the combination of a chamber adapted to receive and contain the said mass, a discharge duct connected with the chamber, the said chamber having walls which gradually converge on all sides of the duct and join the duct walls with substantial smoothness, manually controllable means for supplying a fluid pressure agent to the chamber back of a mass of materials contained therein, and manually controllable means for directing a fluid pressure agent into the discharge duct in the general direction thereof.

35. In a device for treating and moving a mass of concrete forming materials, the combination of a chamber adapted to receive and contain the said means, a discharge duct connected with the chamber, the said chamber having walls which gradually converge on all sides of the duct and join the duct walls with substantial smoothness, manually controllable means for supplying a fluid pressure agent to the chamber back of a mass of materials contained therein, and means manually controllable independently of the aforesaid means for directing a fluid pressure agent into the discharge duct in the general direction thereof.

In testimony, that I claim the foregoing as my own I affix my signature, in presence of two witnesses.

JOHN H. McMICHAEL.

Witnesses:
CARL H. KELLER,
M. A. TRACEY.